March 17, 1959 H. J. WALTER 2,878,105
RECOVERY OF CHLORINE FROM HYDROCHLORIC ACID
Filed July 9, 1956
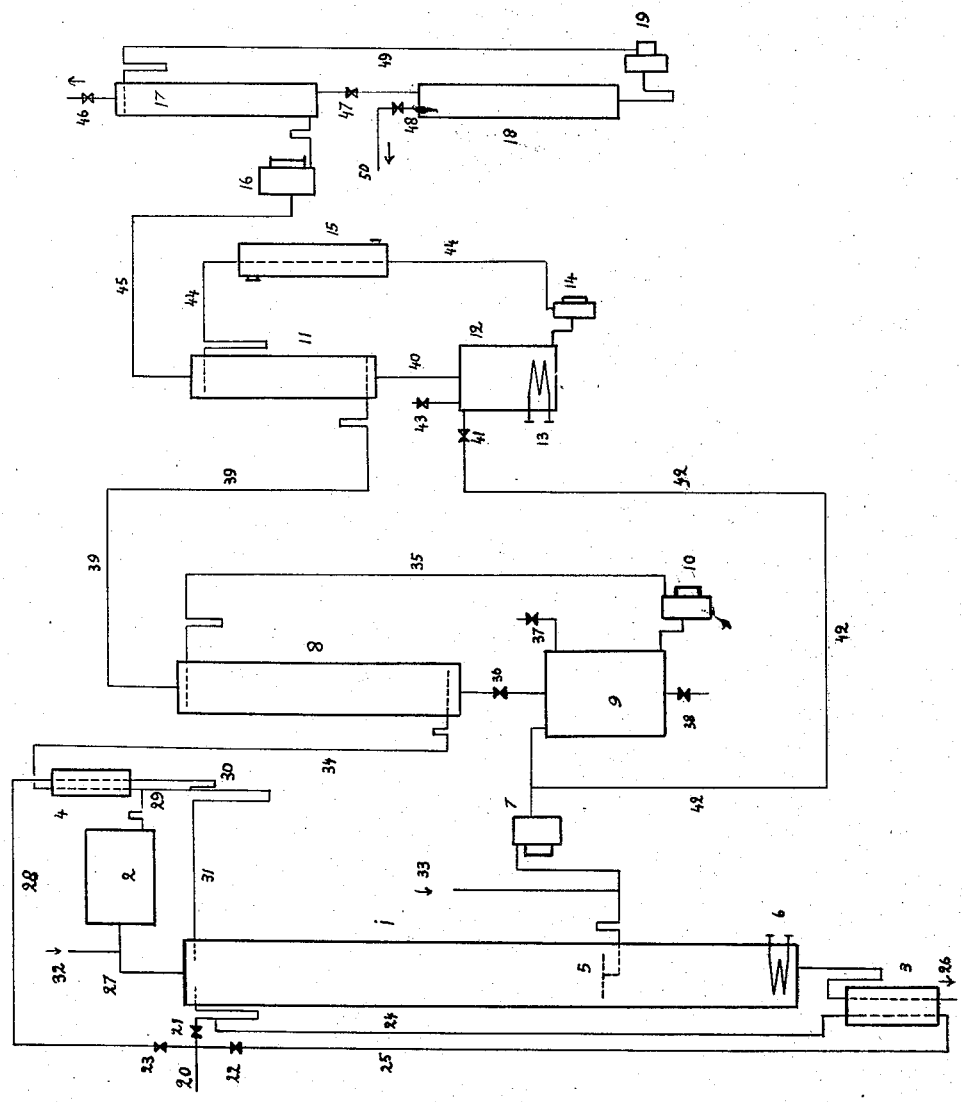
INVENTOR.
Hermine Johanna Walter
BY

United States Patent Office 2,878,105
Patented Mar. 17, 1959

2,878,105
RECOVERY OF CHLORINE FROM HYDROCHLORIC ACID

Hermine Johanna Walter, Huntsville, Ala.

Application July 9, 1956, Serial No. 596,736

3 Claims. (Cl. 23—219)

It is known to transform gaseous hydrogen chloride into chlorine by means of oxidation with nitric acid. Under these circumstances remarkable amounts of nitrosyl chloride are formed, which were likewise oxidized by high percentage nitric acid. Nitrogen dioxide, nitrous acid and nitric oxide, also occurring in this reaction, had to be re-transformed into concentrated nitric acid, which complicated the whole process essentially. In addition to this substantially anhydrous gaseous hydrogen chloride had to be processed. This in turn required a special recuperation of gaseous hydrogen chloride from aqueous solutions thereof, in which form hydrochloric acid is usually recovered, stored and shipped.

In my previous Letters Patent 2,855,279 dated October 7, 1958, I showed, that aqueous liquid hydrochloric acid can immediately be processed to elemental chlorine by means of air as an oxidant and nitrogen dioxide as a catalyst. By this way I can avoid all the before mentioned disadvantages.

My present invention relates likewise to immediate processing of aqueous liquid solutions of hydrochloric acid. This process is characterized by passing vapors, or gases, consisting essentially of nitrogen dioxide, through liquid aqueous solutions of hydrochloric acid. The gaseous mixture thus obtained consists of elemental chlorine, nitric oxide, nitrosyl chloride and possibly excessive quantities of nitrogen dioxide. This gaseous mixture is then transformed into a mixture, essentially consisting of chlorine and nitrogen dioxide. This mixture is then separated, chlorine recovered in a pure state and nitrogen dioxide, which is recycled to the first reaction.

The reaction occurring in the first step is given by the equation:

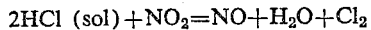
$$2HCl\ (sol) + NO_2 = NO + H_2O + Cl_2$$

Part of chlorine and nitric oxide thus obtained, reacts furthermore with the formation of nitrosyl chloride according to:

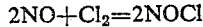
$$2NO + Cl_2 = 2NOCl$$

This first step in my new process was heretofore unknown and even deemed to be impossible on reason of figures of enthalpies and free energies available from literature. It is therefore most surprising, that this reaction is running very smoothly, and more than this, this reaction step is running with unusually high throughputs. By this way the aqueous hydrochloric acid can easily be exhausted to very low percentages with great rates. In addition to this, all nitric values dissolved in said aqueous batch are easily driven out by moderately increased temperatures. This can be understood by the following equilibrium:

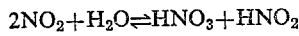
$$2NO_2 + H_2O \rightleftharpoons HNO_3 + HNO_2$$

which is completely shifted to the left hand side at slightly increased temperatures already.

The gaseous reaction products, consisting substantially of chlorine, nitrosyl chloride, nitric oxide and possibly excessive quantities of nitrogen dioxide, are now processed by way of oxidation to a mixture, consisting substantially of chlorine and nitrogen dioxide. This oxidation can be performed in various manners, which is now greatly facilitated, since said reaction products are obtained in concentrated form without the large bulk of water, involved by the aqueous hydrochloric acid processed.

So, for instance, said mixture containing essentially nitrosyl chloride and nitric oxide, may be passed immediately through nitric acid at ambient temperatures, whereby nitric oxide and nitrosyl chloride are oxidized to nitrogen dioxide, whilst a corresponding amount of nitric acid is likewise transformed into nitrogen dioxide. Nitric acid of 40% strength and more are useful for the purpose. However I give preference to concentrations between 50% and 85%.

On the other hand said gaseous mixture, containing essentially nitric oxide and nitrosyl chloride, may be mixed with the appropriate amount of oxygen containing gases like air and then passed through nitric acid in the manner described above. Under these circumstances at least part of nitrogen dioxide, present in the nitric acid, is oxidized to nitric acid, thus balancing decomposition and re-formation of nitric acid.

The described oxidations can furthermore be improved in the following manner: Said gaseous mixture, comprising nitric oxide and nitrosyl chloride are mixed with restricted or even very small amounts of water vapor prior to passing through nitric acid. By this way nitrosyl chloride is substantially hydrolyzed to nitric oxide and hydrogen chloride. The latter is instantaneously oxidized to chlorine by excessive nitrogen dioxide, whilst nitric oxide is oxidized again to nitrogen dioxide by atmospheric oxygen. I found that in the average the oxydation rate of nitric oxide is greater than that of nitrosyl chloride. Said co-addition of water vapor is mostly not necessary, since the gaseous mixture, formed in my first reaction step and consisting essentially of nitric oxide and chlorine, is carrying sufficient quantities of water vapor along. This amount of water vapor proved sufficient to hydrolize already completely nitrosyl chloride or even to oppress the formation of the latter from chlorine and nitric oxide formed.

A pretty cheap and profitable manner of oxidation is performed as follows: The gaseous reaction products, obtained in the first reaction step—that means passing nitrogen dioxide through liquid aqueous hydrochloric acid—consist in general of chlorine, nitric oxide, some nitrosyl chloride, any excessive nitrogen dioxide and restricted amounts of water vapor, carried along by said gases. This is true due to the fact, that said first reaction step is preferably performed at temperatures between 50° C. and boiling point of the acid, especially between 85° C. and 100° C. This water vapor containing gaseous mixture is then mixed with oxygen or preferably with air in amounts, sufficient to oxidize nitric oxide to nitrogen dioxide with sufficient speed. The gaseous mixture thus obtained is then passed through an oxidation chamber of sufficient volume to provide a stay time, necessary to achieve oxidation of nitric oxide to nitrogen dioxide to any desired degree. The temperature inside this chamber is preferably maintained between the boiling point of the aqueous hydrochloric acid and 200° C., especially between 120° C. and 170° C. The oxidation rate can furthermore be increased by performing the oxidation under elevated pressure. A further means to improve said oxidation rate consists in providing said oxidation chamber with catalysts. Silica gel per se or impregnated with about 10% of vanadium pentoxide proved very successful. Other catalyst carriers like pumice stone or other porous material loaded with vanadium pentoxide are likewise useful.

By this way the oxidation of nitric oxide to nitrogen dioxide is performed almost exclusively and immediately by elemental oxygen or air, nevertheless it is of great advantage to pass the gaseous mixture from the oxidation chamber, consisting of chlorine, nitrogen dioxide, water vapor, atmospheric oxygen and nitrogen, through nitric acid of concentrations higher than 45%, preferably between 50% and 85%. This may be performed at ambient temperatures and, if desired, at elevated pressure. By this passage through nitric acid the bulk of nitrogen dioxide is absorbed, any traces of nitric oxide—if present—are oxidized to nitrogen dioxide, and in addition to this some nitric acid is formed with nitrogen dioxide, excessive atmospheric oxygen and water. Nitric acid thus formed may be used profitably to replace that part of nitric acid, which had been transformed into nitrogen dioxide by reacting with nitric oxide. Nitrogen dioxide absorbed in nitric acid can easily be recovered by a pump, which evaporates nitrogen dioxide at the suction point, increases its pressure on the pressure side and conveys it in this state back to the reactor for the first reaction step, viz. reacting liquid aqueous hydrochloric acid with nitrogen dioxide.

The gases, issuing from the above described absorption unit, consist of chlorine, small amounts of nitrogen dioxide, traces of nitric acid, atmospheric oxygen and nitrogen. These are subsequently scrubbed with sulfuric acid of more than 50%, preferably between 60% and 90%. Here traces of nitric acid, nitrogen dioxide as well as residual water vapor are completely eliminated by absorption.

The gases, issuing from the sulfuric acid scrubber, consisting of chlorine, atmospheric oxygen and nitrogen are finally separated by scrubbing with carbon tetrachloride under elevated pressure. Pressures between 200 p. s. i. and 1000 p. s. i., preferably between 300 p. s. i. and 700 p. s. i. are useful. Under these pressures atmospheric oxygen and nitrogen are vented without any significant loss of chlorine or carbon tetrachloride. Chlorine dissolved in carbon tetrachloride is recovered by partial pressure release of said carbon tetrachloride solution down to pressures below 150 p. s. i., preferably between 75 p. s. i. and 150 p. s. i.

The attached drawing gives an illustration of my new process. This however is not restrictive but only given by way of example.

Referring to this position 1 shows the reactor, in which aqueous liquid hydrochloric acid is contacted with nitrogen dioxide. Reactor 1 may be made of steel lined with Karbate, graphite, glass or plastics like chlorinated rubber, polyvinyl chloride, polyethylene or poly-tetrafluoro ethylene, resistant against hot muriatic acid in the presence of nitrogen dioxide and chlorine. In order to provide intimate contact between the gaseous nitrogen dioxide and the liquid aqueous hydrochloric acid it is advisable to provide reactor 1 with packing material like Raschig rings or Berl saddles. Furthermore the aqueous liquid hydrochloric acid may be introduced into the hollow reactor 1 by means of spray nozzles. I prefer to introduce gaseous nitrogen dioxide by means of diffusers 5, which may be made of porous sintered glass, graphite or plastics, as described above. In each event it is advisable to pass the liquid muriatic acid downwards reactor 1 and the gaseous nitrogen dioxide upwards, that means countercurrent. Reactor 1 is preferably externally heat insulated. Heat is admitted through steam coil position 6, made of tantalum, graphite or glass. Other heating devices may likewise be used. So the lower part of reactor 1 may be provided with a jacket. Exhausted muriatic acid leaves reactor 1 below the heating device 6, passes through a necked trap, subsequently through heat exchanger 3 and is finally drawn off at 26.

Liquid aqueous hydrochloric acid is fed in at 20 and thence distributed in controlled manner by the three valves 21, 22 and 23. Muriatic acid via valve 22 is passed through line 25 and heat exchanger 26, where it picks up heat from the effluent exhausted liquor. Subsequently the liquid muriatic acid passes through line 24 and afterconnected necked trap and enters reactor 1 on top thereof. A second part of the muriatic feed may be introduced immediately that means in the cold state, via valve 21 and after-connected necked trap.

The reaction gases from reactor 1, consisting of chlorine, nitrosyl chloride, nitric oxide and excessive nitrogen dioxide, carrying along water vapor corresponding to the temperature prevailing on top of reactor 1, leave reactor 1 via line 27 and are mixed with air through feed point 32. This air is preferably preheated to any temperature between 150° C. and 300° C. The gaseous mixture thus obtained enters oxidation chamber, position 2, which may be filled with catalysts as indicated above. Oxidation chamber 2 may be heated up by a jacket and is made or lined with resistant material as described above. With oxidation chamber 2 there are no serious corrosion problems, since the temperatures inside 2 are preferably maintained between 120° C. and 170° C. The oxidation products from chamber 2 leave that chamber via a gas trap and enter heat exchanger 4 through point 29, where condensed liquor is flowing downwards, and the gases are flowing upwards heat exchanger 4 via line 34, to the following position 8.

Another part of muriatic feed is passed via 20, 23 and 28 through heat exchanger 4, where said liquid acid is heated up. This part of hot acid meets the condensate from point 29 at junction point 30 and thence flows via necked trap and line 31 into the top of reactor 1. By appropriate distribution of muriatic feed it is possible to control the temperature inside 1 and likewise the amount of water vapor escaping on top of 1 with ease.

The gases, passed through line 34, enter scrubber 8 near the bottom thereof. Scrubber 8 is provided with nitric acid as indicated above and may be preferably packed with Raschig rings or the like. Nitric acid, loaded with nitrogen dioxide, leaves scrubber 8 below, passes valve 36 and is collected in vessel 9. 8 and 9 may be lined or made of similar material as reactor 1. Nitrogen dioxide is completely or partially removed from the nitric acid by the suction action of compressor 7, which forces nitrogen dioxide into reactor 1 via diffuser 5. By this way recovery and recycliffiing of nitrogen dioxide is performed without wasting heat and cooling water. Any additional nitrogen dioxide or nitrogen dioxide forming compounds may be introduced through feed point 33. Vessel 9 may be filled by 37 and drained by 38, if desired. Regenerated nitric acid in 9 is recycled by means of pump 10 and line 35 to the top of scrubber 8. Recuperation of nitrogen dioxide from the nitric acid inside vessel 9 may be performed continuously or intermittently.

The gases issuing from top of 8 pass through line 39 to the lower end of sulfuric acid scrubber 11, which is similarly made as position 8. Sulfuric acid loaded with the last residues of nitrogen dioxide and water, leave scrubber 11 through line 40 and enter vessel 12. This vessel is provided with a heating device 13. By means of this nitrogen dioxide and water, accumulated, can be expelled by heat and recycled via valve 41 and line 42 to compressor 7. Regenerated sulfuric acid is recycled via pump 14, line 44 and cooler 15 to the top of scrubber 11. According to my experience it is advisable to operate this unit mostly without heating up vessel 12 and without operating cooler 15, which are used only intermittently. However this unit may likewise be operated full—continuously. Vessel 12 is provided with feed point 43 for making up sulfuric acid, if necessary.

The scrubber gases, leaving the top of 11, are passed through line 45 and subsequently compressed by compressor 16 up to a pressure of about 700 p. s. i. to 800 p. s. i. and then forced via a gas trap into carbon tetrachloride scrubber 17. This scrubber is made of pressure resistant steel, since only carbon tetrachloride and dry chlorine are present, besides atmospheric oxygen and nitrogen. The latters are vented on top of 17 via valve 46. Chlorine, dissolved in carbon tetrachloride, is passed via valve 47 into vessel 18. Vessel 18 is made similarly to scrubber 17 with the only difference, that in 18 a lower superatmospheric pressure is maintained of about 75 p. s. i. to 150 p. s. i. By this way chlorine is recovered in the gaseous state and collected via valve 48 at collection point 50. Carbon tetrachloride, generally still containing small amounts of chlorine, is recycled via compressor 19 and line 49 to the top of high-pressure scrubber 17. A valuable modification of my invention consists in increasing the throughput of muriatic acid to such an extent, that the exhausted muriatic acid still contains ca. 3% to 10% hydrogen chloride, subsequently passing it to any point in the factory for re-absorption of gaseous hydorgen chloride, followed again by recycling the re-enriched acid to the recuperation unit.

*Example*

A reactor, made of glass, was provided with 600 ccm. aqueous hydrochloric acid of 20% hydrogen chloride. The reactor was filled with Raschig rings. Its height amounted to 150 cm., its diameter to 3 cm. Nitrogen dioxide was passed through the reactor in an amount of 2.5 moles per hour. The temperature inside the hydrochloric acid was maintained between 95° C. and 105° C. The reaction gases above the level of the liquid aqueous hydrochloric acid showed a faintly brownish-greenish colour. Subsequently preheated air of about 250° C. was admixed at a point after the reactor. This caused immediately a tinting of the reaction gases to intense brown. This oxidation e. g. re-formation of nitrogen dioxide was accomplished in an adjacent oxidation chamber of 200 ccm. capacity and a temperature of between 125° C. and 140° C. Subsequently the reaction gases were passed through nitric acid (D 1.42) and thence passed through a sulfuric acid scrubber. The finally obtained chlorine was determined volumetrically. By this way 102 g chlorine were produced per hour.

What I claim is a process for:

1. A process for the recovery of chlorine from hydrochloric acid, characterized by passing nitrogen dioxide through liquid aqueous solutions of hydrochloric acid at temperatures between 85% C. and 100° C., subsequently admixing air in sufficient amounts to oxidize substantially all nitric values to nitrogen dioxide, followed by washing out nitrogen dioxide by means of nitric acid and of sulfuric acid, whereby nitrogen dioxide, thus recovered, is recycled to the first reaction step, whilst chlorine is finally separated from residual air by pressure absorption.

2. A process for the recovery of chlorine from hydrochloric acid, characterized by passing nitrogen dioxide through liquid aqueous solutions of hydrochloric acid at temperatures between 50° C. and the boiling point of the aqueous hydrochloric acid, subsequently admixing air in sufficient amounts to oxidize substantially all nitric values to nitrogen dioxide, followed by washing out nitrogen dioxide by means of nitric acid and of sulfuric acid, whereby nitrogen dioxide, thus recovered, is recycled to the first reaction step, whilst chlorine is finally separated from residual air by pressure absorption.

3. A process for the recovery of chlorine from hydrochloric acid by passing nitrogen dioxide through liquid aqueous solutions of hydrochloric acid at temperatures between 50° C. and the boiling point of the aqueous hydrochloric acid, subsequently admixing air in sufficient amounts to oxidize substantially all nitric values to nitrogen dioxide, followed by washing out nitrogen dioxide by means of nitric acid and of sulfuric acid, whereby chlorine is separated by pressure absorption characterized by the fact that the throughput of the aqueous hydrochloric acid in the first reaction step is increased to such an extent, that the exhausted hydrochloric acid still contains 3% to 10% hydrogen chloride, subsequently passing said partially exhausted hydrochloric acid to any point for re-loading with gaseous hydrogen chloride, whereupon the enriched acid is recycled back to the recovery unit.

References Cited in the file of this patent

UNITED STATES PATENTS

| | | |
|---|---|---|
| 623,447 | Vogt et al. | Apr. 18, 1899 |
| 1,310,943 | Datta | July 22, 1919 |
| 2,665,195 | Congdon et al. | Jan. 5, 1954 |

OTHER REFERENCES

"Comprehensive Treatise on Inorganic and Theoretical Chemistry," by Mellor, vol. 8, pages 541, 618–19. Published by Longmans, Green and Co., N. Y., 1928.